(12) United States Patent
Suzuki et al.

(10) Patent No.: US 6,715,934 B2
(45) Date of Patent: Apr. 6, 2004

(54) RECEPTACLE TYPE OPTICAL MODULE AND PRODUCTION METHOD THEREFOR

(75) Inventors: Fumitake Suzuki, Kawasaki (JP); Takashi Shiotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 230 days.

(21) Appl. No.: 10/046,223

(22) Filed: Jan. 16, 2002

(65) Prior Publication Data

US 2003/0059177 A1 Mar. 27, 2003

(30) Foreign Application Priority Data

Sep. 27, 2001 (JP) .................................... 2001-296246

(51) Int. Cl.[7] .................................................. G02B 6/36
(52) U.S. Cl. ............................ 385/88; 385/91; 385/92; 385/93
(58) Field of Search ...................................... 385/88–94

(56) References Cited

U.S. PATENT DOCUMENTS

| 6,220,764 B1 | * | 4/2001 | Kato et al. ..................... 385/92 |
| 6,318,908 B1 | * | 11/2001 | Nakanishi et al. ............. 385/89 |
| 6,435,734 B2 | * | 8/2002 | Okada et al. .................. 385/88 |
| 6,459,710 B1 | * | 10/2002 | Whitney et al. .......... 372/29.02 |
| 2003/0026557 A1 | * | 2/2003 | Galeotti et al. ................ 385/94 |

FOREIGN PATENT DOCUMENTS

| JP | 03-096906 A | 4/1991 |
| JP | 04-254388 A | 9/1992 |
| JP | 06-258556 A | 9/1994 |
| JP | 10-268157 A | 10/1998 |

* cited by examiner

Primary Examiner—Rod Bovernick
Assistant Examiner—Juliana Kang
(74) Attorney, Agent, or Firm—Staas & Halsey LLP

(57) ABSTRACT

A receptacle type optical module including a lead frame having a plurality of leads, an L-shaped block mounted on the lead frame and having a through hole, a ferrule inserted and fixed in the through hole of the L-shaped block and having an optical fiber, a carrier mounted on the L-shaped block and having a wiring pattern, and an optical element mounted on the carrier. The optical module further includes a GRIN lens fixed to an end face of the ferrule and having a spherical end face adjacent to the optical element, a transparent resin for sealing an optical coupling portion between the optical element and the GRIN lens, and a resin molded package for encapsulating all of the lead frame, the L-shaped block, the ferrule, the carrier, and the optical element except a part of the lead frame and a part of the ferrule.

8 Claims, 9 Drawing Sheets

RECEPTACLE TYPE OPTICAL MODULE AND PRODUCTION METHOD THEREFOR

BACKGROUND OF THE INVENTION

1. Field of the Invention

The present invention relates to a receptacle type optical module and a production method therefor.

2. Description of the Related Art

In an optical communication system using an optical fiber as a transmission line, a laser diode module (LD module) is used to introduce light emitted from a light emitting component (e.g., laser diode) into the optical fiber. In the LD module, the light emitting component and the incident end face of the optical fiber are fixed in a given positional relationship, and a condenser lens is interposed between the light emitting component and the incident end face of the optical fiber. In this kind of LD module, the positional relation between components has a direct effect on optical coupling efficiency, so that the components must be positioned with an extremely high accuracy as less than or equal to 1 μm. Further, this positioning accuracy must be maintained for a long period of time.

The components mounted on a printed wiring board built in a communication device are generally classified into a surface mount type and a through hole mount type. A typical example of the surface mount type components is an LSI, which has a form called a flat package. Such a component is soldered to the printed wiring board by a reflow soldering process. This process is performed by printing a solder paste on the printed wiring board, making the surface mount type component stick to the printed solder paste, and heating the whole in a conveyer furnace to a solder surface temperature of 220° C. or higher.

A typical example of the through hole mount type components is a large-capacity capacitor or a multi-terminal (200 or more terminals) LSI. The multi-terminal LSI has a terminals form called a PGA (Pin Grid Array). Such a through hole mount type component is soldered to the printed wiring board by a flow soldering process. This process is performed by inserting the terminals of the through hole mount type component into through holes of the printed wiring board, and putting the printed wiring board into a solder bath heated at about 260° C. from the side opposite to its component mounting surface.

In mounting an optical module such as an LD module on the printed wiring board by soldering like the surface mount type component or the through hole mount type component, a so-called pigtail type optical module with an optical fiber cord is not suitable as the optical module. That is, the optical fiber cord usually has a nylon coating, and the nylon coating has a low resistance to heat at about 80° C., so that it is melted in the soldering step. Furthermore, the optical fiber cord itself invites inconveniences in accommodation and handling at a manufacturing location, causing a remarkable reduction in mounting efficiency to the printed wiring board. Accordingly, to allow a soldering process for the optical module and reduce a manufacturing cost, the provision of a so-called receptacle type optical module is indispensable.

A surface-mount receptacle type optical module is disclosed in U.S. Pat. No. 6,181,854B1. This receptacle type optical module is produced in the following manner. An LD is mounted on an Si substrate, and a ferrule having an optical fiber is inserted in a V groove formed on the Si substrate and fixed in the V groove by an adhesive. Further, a block having a groove similar in cross section to the V groove of the Si substrate is mounted on the Si substrate so as to press the ferrule from the upper side thereof. The ferrule is fixed in the V groove of the Si substrate by applying the adhesive to the upper side of the ferrule and then curing the adhesive.

In mounting the LD, the mounting accuracy must be made to fall within ±1 μm. The LD used in this optical module is a spot-size converted LD (SSC-LD) designed so that the spot size is reduced to attain efficient incidence of light on the optical fiber. A transparent silicone resin is applied to an optical coupling portion between the LD and the optical fiber, thereby sealing the optical coupling portion with the resin. Further, all the components are molded with epoxy resin in the condition where an end portion of the ferrule is projected from the side surface of the substrate, thus completing the optical module.

The receptacle type optical module described in the above patent has the following two problems. One of the two problems is the lack of mechanical rigidity, and the other is the use of a special-purpose LD. The receptacle type optical module is required to have a strength against pressures received in connecting and disconnecting an optical connector. Accordingly, it is difficult to maintain a sufficient strength by the molding resin, and the ferrule is therefore held between the Si substrate and the block and bonded together by the adhesive, thus reinforcing the optical module. However, the strength on the Si substrate with the V groove depends on the strength of the adhesive, and if the amount of the adhesive to be charged is not controlled, there arises a problem such that the molding resin may enter the bonded portion between the ferrule and the Si substrate.

Furthermore, the rigidity of the Si substrate is insufficient, so that the substrate may be warped by a stress in bonding the substrate to the lead frame or in molding, causing misalignment of the optical fiber and an output loss. In the optical module described in the above patent, the Si substrate is formed with a sectionally rectangular groove perpendicular to the V groove, so as to make the end face of the ferrule abut against the inner wall surface of this rectangular groove. Accordingly, the presence of this rectangular groove may accelerate the warpage of the substrate by the stress in bonding the substrate to the lead frame or in molding. Furthermore, since the LD is mounted directly on the Si substrate, whether or not the deterioration of the LD due to the mounting on the Si substrate has occurred must be evaluated after completing the optical module, so that the cost of product is largely determined by the yield in such a screening step.

SUMMARY OF THE INVENTION

It is therefore an object of the present invention to provide a receptacle type optical module having sufficient mechanical rigidity which can be produced at a low cost.

It is another object of the present invention to provide a production method for a receptacle type optical module having sufficient mechanical rigidity.

In accordance with an aspect of the present invention, there is provided a receptacle type optical module comprising a lead frame having a plurality of leads; a block mounted on the lead frame, the block having a through hole; a ferrule inserted and fixed in the through hole of the block, the ferrule having an optical fiber; a carrier mounted on the block, the carrier having a wiring pattern; an optical element mounted on the carrier; a graded index lens fixed to an end face of the ferrule, the graded index lens having a spherical end face adjacent to the optical element; and a transparent resin for sealing an optical coupling portion between the optical element and the graded index lens.

Preferably, the block has an L-shape. By using the L-shaped block with the ferrule inserted and fixed in the through hole, sufficient mechanical rigidity can be obtained to ensure a strength against pressures received in connecting and disconnecting an optical connector and in molding. Further, since the optical element is mounted on the carrier to prepare a carrier assembly, the reliability of the optical element can be evaluated in the form of the carrier assembly. Accordingly, a cost increase due to module assembly yield can be suppressed.

The optical element comprises a laser diode, for example. Preferably, the transparent resin comprises a silicone resin. Preferably, the optical module further comprises resin flow blocking means (dam) formed on the L-shaped block at a position under the graded index lens. The dam is formed of a resin having a viscosity higher than that of the transparent resin. By adding the dam, the flow of the silicone resin having a relatively low viscosity and high transparency can be prevented to thereby reliably achieve the resin sealing of the optical coupling portion.

In accordance with another aspect of the present invention, there is provided a receptacle type optical module comprising a lead frame having a plurality of leads; an L-shaped block mounted on the lead frame, the L-shaped block having a through hole; a ferrule inserted and fixed in the through hole of the L-shaped block, the ferrule having an optical fiber; a carrier mounted on the L-shaped block, the carrier having a wiring pattern; an optical element mounted on the carrier; a graded index lens fixed to an end face of the ferrule, the graded index lens having a spherical end face adjacent to the optical element; a transparent resin for sealing an optical coupling portion between the optical element and the graded index lens; and a resin molded package for encapsulating all of the lead frame, the L-shaped block, the ferrule, the-carrier, and the optical element except a part of the lead frame and a part of the ferrule.

In accordance with a further aspect of the present invention, there is provided a production method for a receptacle type optical module, comprising the steps of mounting an optical element on a carrier having a wiring pattern; connecting the wiring pattern of the carrier and the optical element by means of a first wire; performing a screening test for the optical element; preparing an L-shaped block having a through hole; press-fitting a ferrule having an optical fiber into the through hole of the L-shaped block; mounting the carrier on the L-shaped block in the condition where the optical element is mounted on the carrier; bonding a graded index lens to an end face of the ferrule after aligning the graded index lens to the optical fiber and the optical element; mounting the L-shaped block on a lead frame; connecting the wiring pattern of the carrier and the lead frame by means of a second wire; sealing an optical coupling portion between the optical element and the graded index lens with a transparent resin; and encapsulating all of the lead frame, the L-shaped block, the ferrule, the carrier, and the optical element except a part of the lead frame and a part of the ferrule in a resin molded package.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
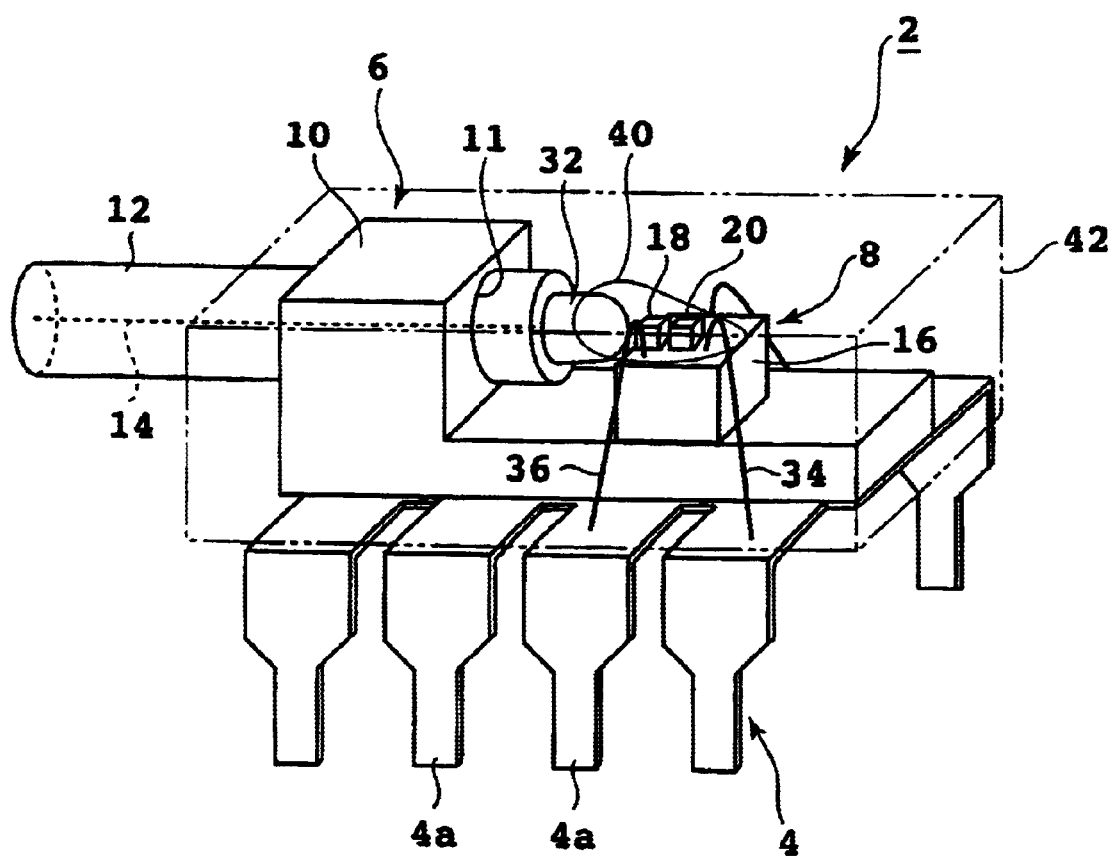
FIG. 1 is a perspective view of a receptacle type optical module according to a first preferred embodiment of the present invention.

Referring to FIG. 1, there is shown a perspective view of a receptacle type optical module 2 according to a first preferred embodiment of the present invention. A ferrule assembly 6 is mounted on a lead frame 4 having a plurality of leads 4a. A carrier assembly 8 is mounted on the ferrule assembly 6. The ferrule assembly 6 is composed of an L-shaped metal block 10 having a through hole 11 and a ferrule 12 press-fitted with the through hole 11 of the metal block 10. The ferrule 12 has a central hole in which an optical fiber 14 is inserted and fixed. The metal block 10 is formed of stainless steel, for example. The ferrule 12 is a cylindrical ferrule formed of zirconia and having an outer diameter of 1.25 mm, for example. The ferrule 12 may be formed of any other ceramic materials such as alumina, or may be formed of metal.

Figure 2:
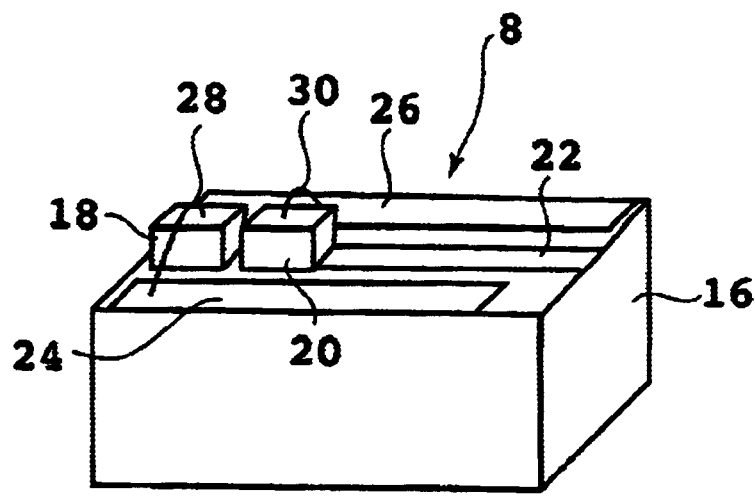
FIG. 2 is a perspective view of a carrier assembly.

As shown in FIG. 2, the carrier assembly 8 has a ceramic carrier 16. The ceramic carrier 16 has a metallized lower surface, which is soldered to the L-shaped block 10. A grounding electrode pattern 22 and a pair of signal electrode patterns 24 and 26 are formed on the upper surface of the carrier 16. A laser diode (LD) 18 and a monitor photodiode (monitor PD) 20 are mounted on the grounding electrode pattern 22. The LD 18 and the signal electrode pattern 24 are connected through a gold wire 28 by wire bonding, and the monitor PD 20 and the signal electrode pattern 26 are connected through a gold wire 30 by wire bonding.

Figure 3:
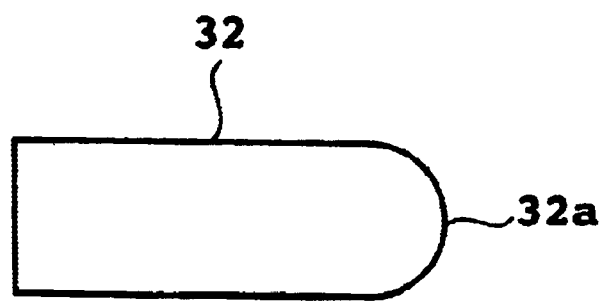
FIG. 3 is a side view of a GRIN lens.

A graded index lens (GRIN lens) 32 having a spherical front end 32a as shown in FIG. 3 is bonded to an end face of the ferrule 12. The grounding electrode pattern 22 of the carrier assembly 8 and the lead frame 4 are connected through a gold wire 34 by wire bonding, and the signal electrode patterns 24 and 26 of the carrier assembly 8 and the lead frame 4 are connected through gold wires 36 and 38 by wire bonding.

An optical coupling portion between the LD 18 and the optical fiber 14 and an optical coupling portion between the LD 18 and the monitor PD 20 are sealed with a transparent resin 40 such as silicone resin. Further, all of the lead frame 4, the L-shaped block 10, the ferrule 12, the carrier 16, the LD 18, and the monitor PD 20 except a part of the lead frame 4 and a part of the ferrule 12 are encapsulated in a resin molded package 42.

An assembling process for the optical module 2 will now be described with reference to the flowchart shown in FIG. 4. In step S10, the LD 18 and the monitor PD 20 are mounted on the grounding electrode pattern 22 of the ceramic carrier 16 by using an AuSn solder or the like. In step S11, the LD 18 and the signal electrode pattern 24 of the carrier 16 are connected by bonding the gold wire 28, and the monitor PD 20 and the signal electrode pattern 26 of the carrier 16 are similarly connected by bonding the gold wire 30, thus completing the carrier assembly 8.

In step S12, the carrier assembly 8 is subjected to a screening test for evaluating the reliability of assembling of optical elements to determine whether or not the carrier assembly 8 is acceptable. The screening test includes an automatic current control test (ACC test) and an automatic power control test (APC test). In step S13, the carrier assembly 8 having passed the screening test is mounted on the ferrule assembly 6 and fixed by soldering. At this time, misalignment of the LD 18 and the optical fiber 14 is required to be minimized, so as to suppress loss of an optical output and to narrow the range of alignment to be performed in the next step. Accordingly, a component mounting method using image recognition as shown in FIGS. 5 and 6 is adopted.

Figure 5:
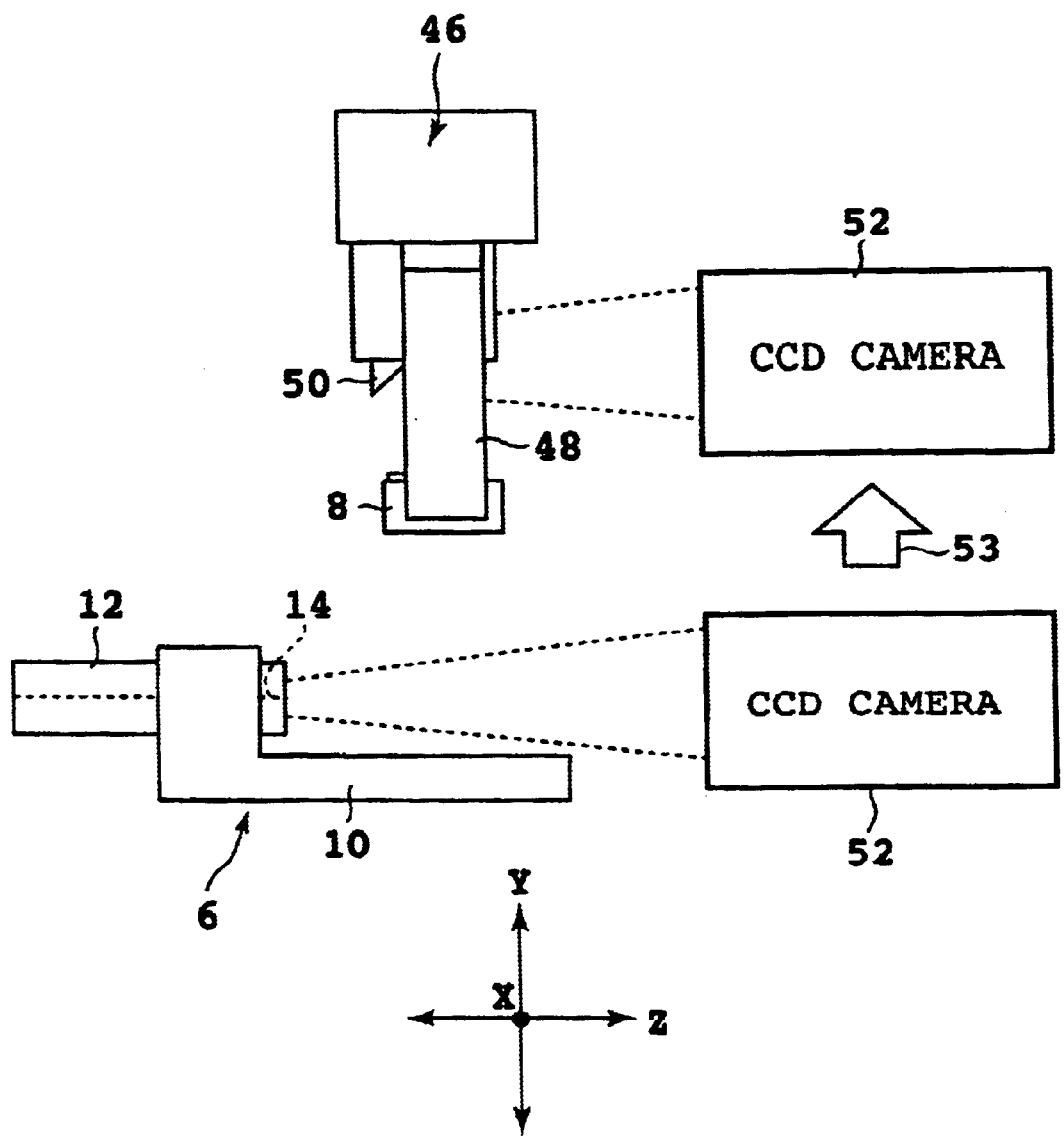
FIG. 5 is a side view illustrating a recognizing method for an optical fiber and an LD.
Figure 6:
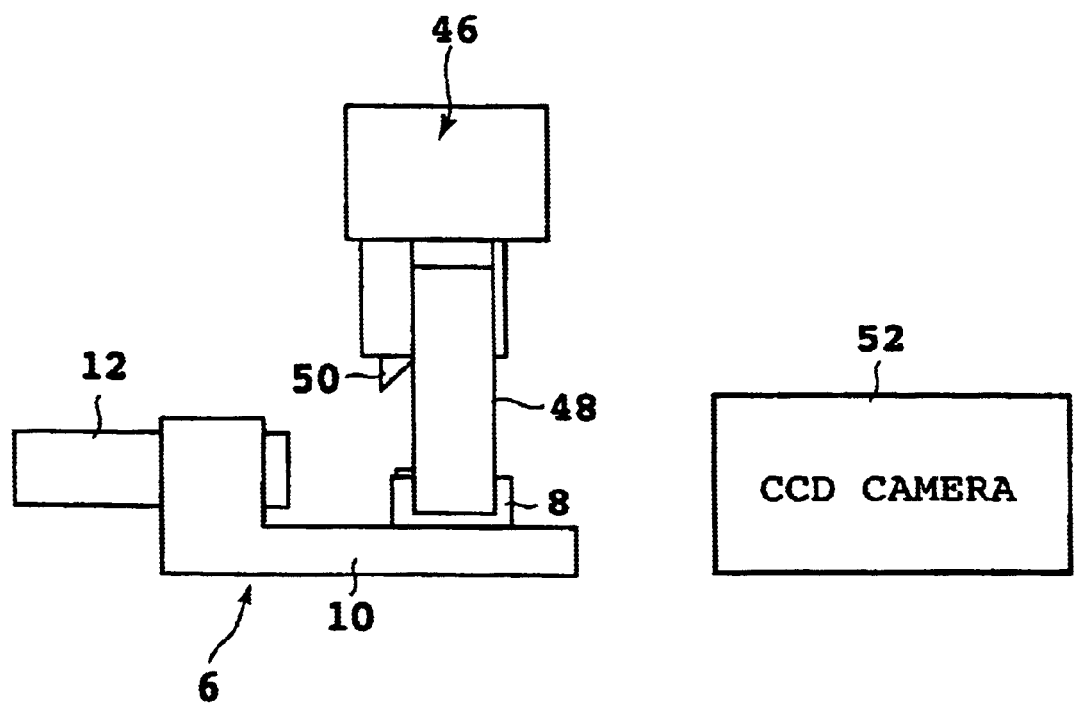
FIG. 6 is a side view illustrating a mounting method for the carrier assembly.
Figure 7A:
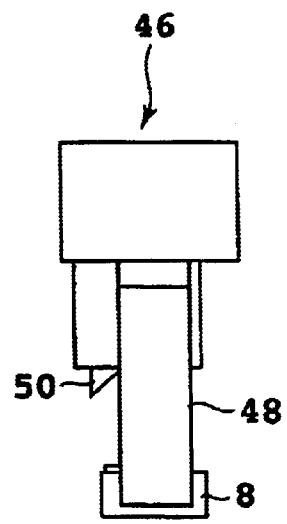
FIG. 7A is an elevational view of a clamp mechanism for the carrier assembly.
Figure 7B:
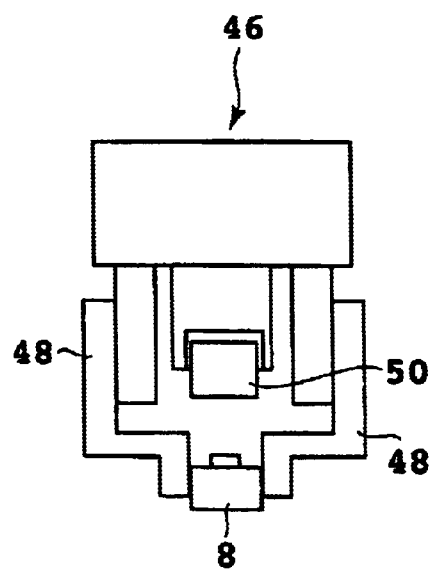
FIG. 7B is a right side view of FIG. 7A.

As shown in FIG. 5, a CCD camera 52 located in opposition to the end face of the ferrule 12 is used to read three-dimensional position data (X, Y, and Z coordinates) of the center position of the optical fiber 14. As best shown in FIGS. 7A and 7B, the carrier assembly 8 is held by a pair of clampers 48 of a clamp mechanism 46, and is carried to a position in the vicinity of a carrier assembly mounting position on the ferrule assembly 6.

Thereafter, the CCD camera 52 is vertically moved in the Y-axis direction as shown by an arrow 53 in FIG. 5 up to the same height as that of a 45° inclined mirror 50 mounted on the clamp mechanism 46. In this condition, the 45° inclined mirror 50 is located over the LD 18 to image the upper surface of the LD 18 into the CCD camera 52. Then, the center position of the LD 18 is calculated according to the image data of the upper surface of the LD 18. Furthermore, the mounting position of the carrier assembly 8 is calculated according to the coordinates of the center position of the optical fiber 14 and the coordinates of the center position of the LD 18. Thereafter, the clamp mechanism 46 is moved as shown in FIG. 6 so as to mount the carrier assembly 8 at the calculated position on the ferrule assembly 6, and the carrier assembly 8 thus mounted is soldered to the L-shaped block 10.

Figure 4:
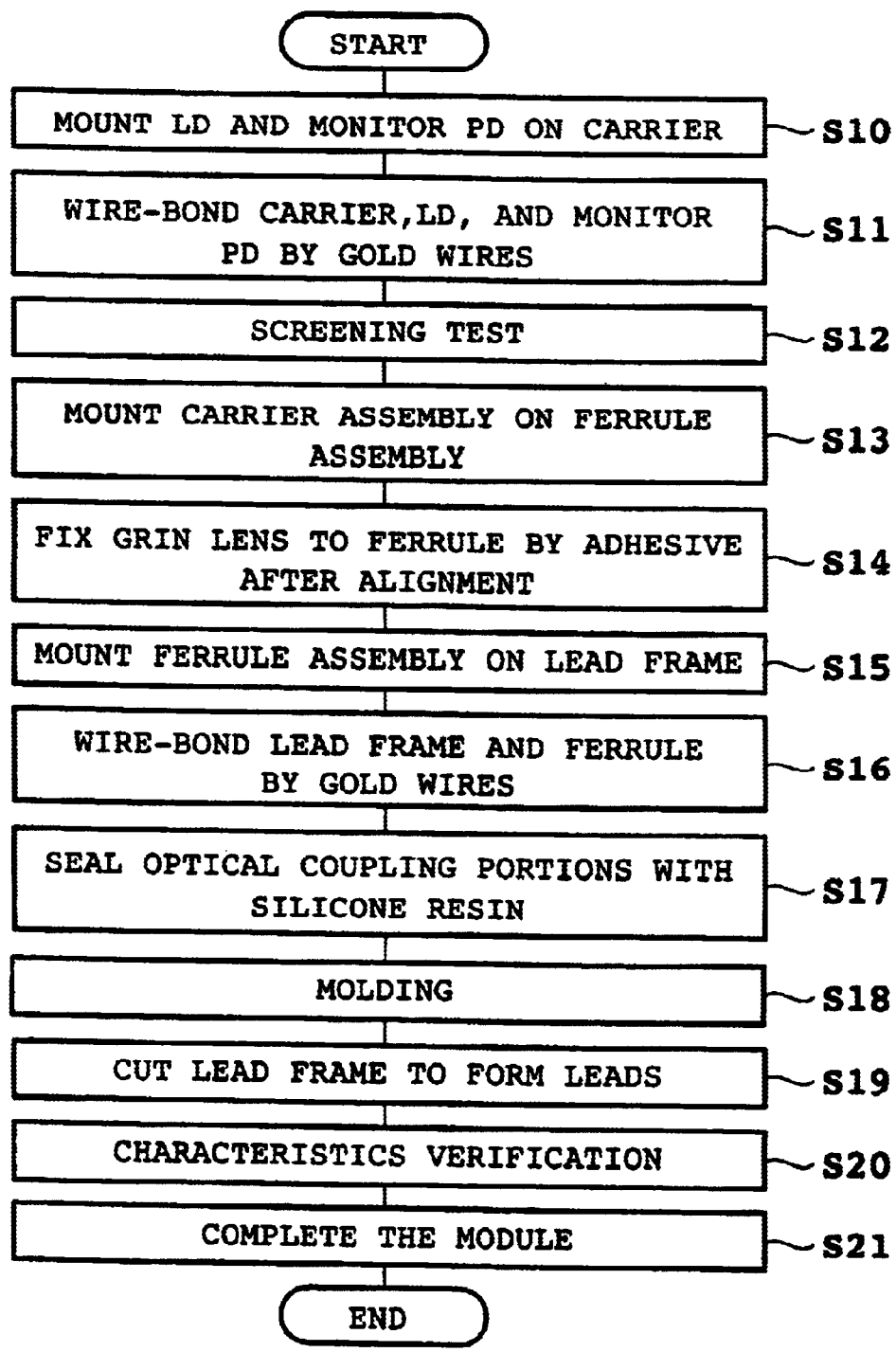
FIG. 4 is a flowchart showing an optical module assembling process according to the present invention.
Figure 8:
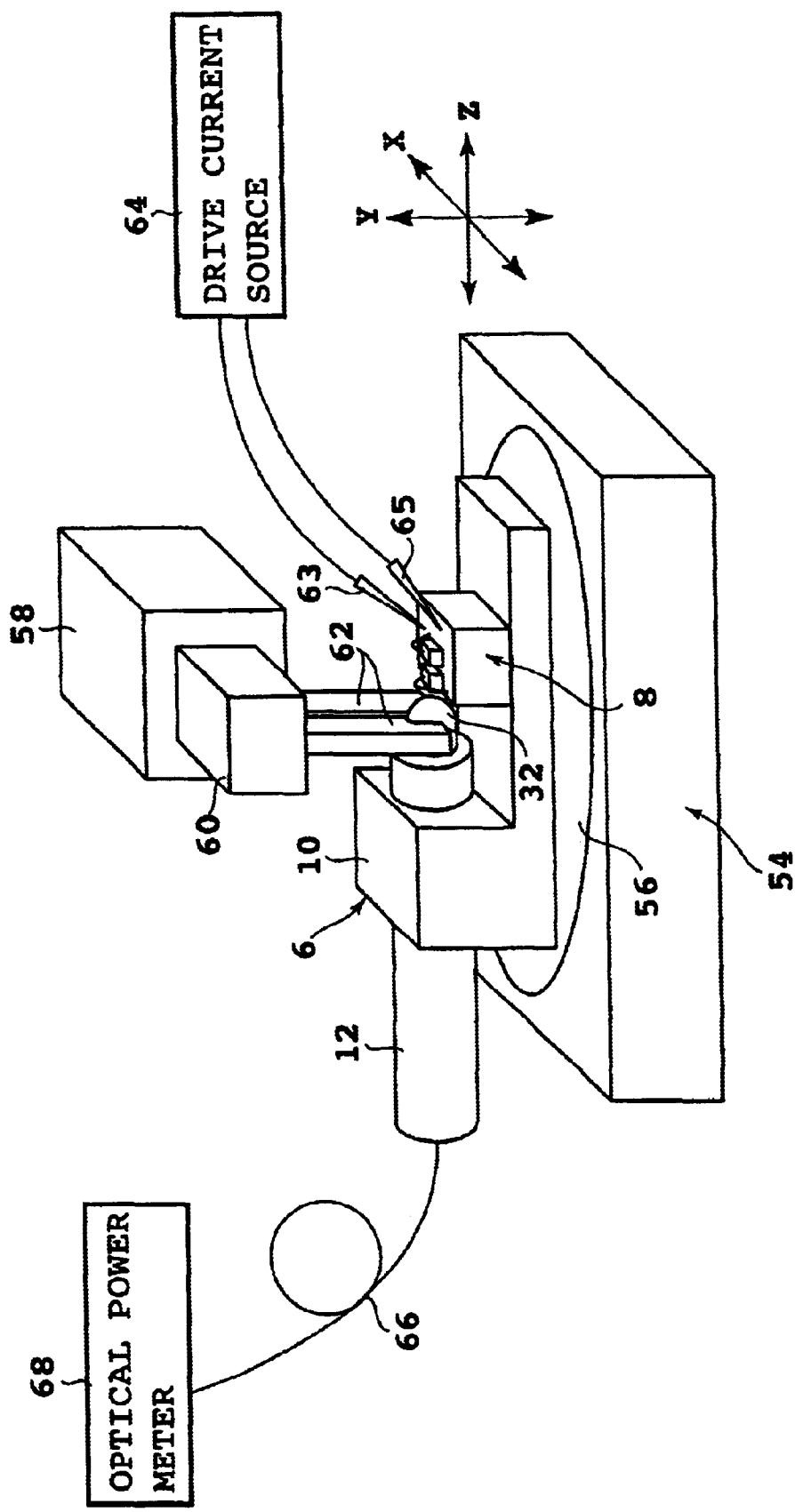
FIG. 8 is a perspective view of an aligning mechanism for the GRIN lens.

Referring again to the flowchart shown in FIG. 4, the program proceeds to step S14 after the carrier assembly 8 is mounted on the ferrule assembly 6. In step S14, the GRIN lens 32 is subjected to alignment and bonded to the ferrule 12. The alignment of the GRIN lens 32 is performed by using an aligning mechanism shown in FIG. 8. Reference numeral 54 denotes a ferrule assembly retaining mechanism having a rotatable gimbal 56. The ferrule assembly 6 is mounted on the gimbal 56 of the ferrule assembly retaining mechanism 54.

A lens holding unit 60 having a pair of fingers 62 is mounted on a three-axial stage 58. The GRIN lens 32 is held by the fingers 62 of the lens holding unit 60, and moved to a position between the carrier assembly 8 and the ferrule 12. At this time, the gimbal 56 of the ferrule assembly retaining mechanism 54 is rotated to make an end face of the GRIN lens 32 opposite to the spherical front end 32a and the end face of the ferrule 12 parallel to each other. In this parallel condition, the ferrule assembly retaining mechanism 54 is clamped.

Thereafter, the lens holding unit 60 is moved in the Z-axis direction to move the GRIN lens 32 so that the distance between the end face of the ferrule 12 and the end face of the GRIN lens 32 becomes 5 to 10 μm. An optical connector (not shown) connected to one end of an optical fiber cord 66 is engaged with the other end of the ferrule 12 projecting from the block 10. The other end of the optical fiber cord 66 is connected to an optical power meter 68.

Probes 63 and 65 connected to a drive current source 64 are applied to the grounding electrode pattern 22 and the signal electrode pattern 24 of the carrier 16, respectively, and a drive current is loaded on the LD 18. In this condition, the GRIN lens 32 is subjected to spiral search and cross search on the X-Y plane to thereby adjust the GRIN lens 32 so that an output from the optical power meter 68 becomes maximum. Thus, the alignment of the GRIN lens 32 is finished.

After finishing the alignment of the GRIN lens 32, a UV adhesive having heat curability is applied to the gap between the GRIN lens 32 and the ferrule 12, and the GRIN lens 32 is moved toward the ferrule 12 so that the distance between the end face of the GRIN lens 32 and the end face of the ferrule 12 becomes about 3 μm. Thereafter, the GRIN lens 32 is aligned again and UV radiation is applied to the UV adhesive to cure the UV adhesive. The UV adhesive used herein is transparent to visible light and infrared light, so that the UV adhesive has no interference with transmission of an optical signal from the LD 18 even after curing, but the optical signal is coupled to the optical fiber 14.

In step S15, the ferrule assembly 6 thus completed is mounted on the lead frame 4 by using a heat-curable conductive adhesive or the like. In step S16, the lead frame 4 and the carrier assembly 8 are connected by bonding the gold wires 34, 36, and 38. In step S17, the optical coupling portion between the LD 18 and the optical fiber 14 and the optical coupling portion between the LD 18 and the monitor PD 20 are sealed with the heat-curable transparent silicone resin 40.

If the end face of the GRIN lens 32 opposed to the LD 18 is flat, there is a problem that when the transparent silicone resin 40 having a relatively low viscosity is applied in the range from the cylindrical portion of the GRIN lens 32 to the carrier 16, air bubbles are easy to enter the silicone resin 40 on this end face of the GRIN lens 32. Further, in this case, it is necessary to form a dam by charging a high-viscous resin between the GRIN lens 32 and a side surface of the carrier 16 in order to prevent the low-viscous transparent silicone resin 40 from flowing away. However, air bubbles are easy to enter the silicone resin 40 during charging because the gap between the GRIN lens 32 and the carrier 16 is narrow. To prevent these problems, the end face 32a of the GRIN lens 32 is spherically formed as shown in FIG. 3 according to the present invention, thereby facilitating the charging of the silicone resin 40 into the narrow gap between the GRIN lens 32 and the carrier 16. Further, since the GRIN lens 32 has the spherical front end 32a, the silicone resin 40 can be charged along the spherical surface of the front end 32a, thereby suppressing the entry of air bubbles into the silicone resin 40.

In step S18, epoxy resin is molded so as to encapsulate all of the lead frame 4, the L-shaped block 10, the ferrule 12, the carrier 16, the LD 18, and the monitor PD 20 except a part of the lead frame 4 and a part of the ferrule 12. In step S19, the lead frame 4 is cut to form the leads 4a. Finally, the characteristics are verified (step S20) to complete the optical module (step S21).

Figure 9A:
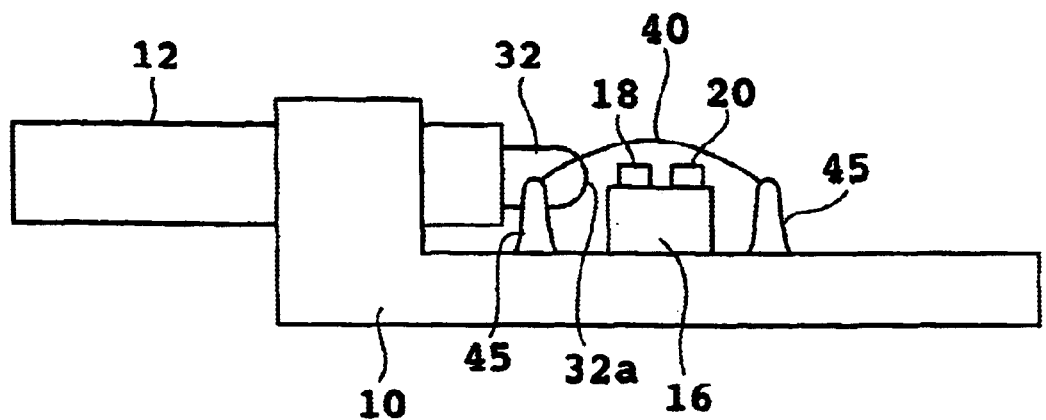
FIG. 9A is a side view of an optical module having resin flow blocking means according to a modification of the first preferred embodiment.
Figure 9B:
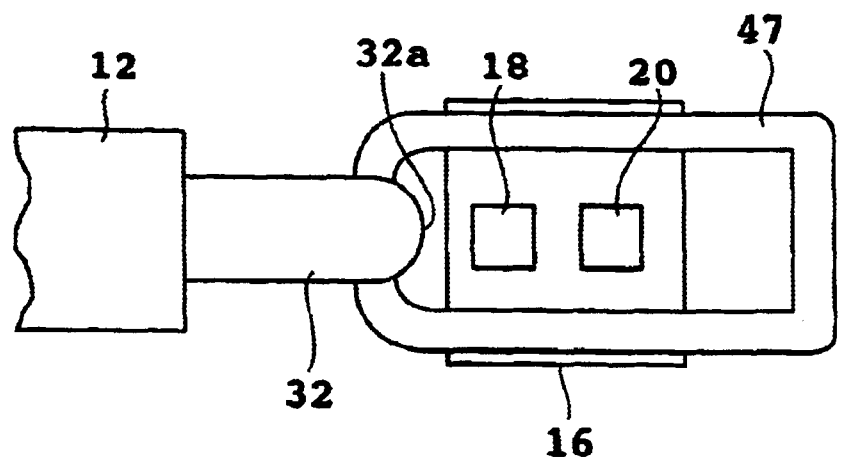
FIG. 9B is a top plan view of an optical module having resin flow blocking means according to another modification of the first preferred embodiment.

FIGS. 9A and 9B show modifications of the first preferred embodiment. In each modification, resin flow blocking means (dam) is added to the configuration of the first preferred embodiment. In the case that a resin having a low viscosity (e.g., 4,000 mPa. s) is used as the transparent sealing resin 40, it is difficult to fill the gap between the GRIN lens 32 and the carrier 16 with the resin 40. To cope with this problem, the modification shown in FIG. 9A includes a resin flow blocking portion 44 formed of a resin having a viscosity higher than that of the transparent resin 40. The resin flow blocking portion 44 is formed on the L-shaped block 10 so as to interpose an area under the spherical front end 32a of the GRIN lens 32 in cooperation with the side surface of the carrier 16 opposed to the front end 32a. Furthermore, another resin flow blocking portion 45 formed of a resin similar to that of the resin flow blocking portion 44 is formed on the L-shaped block 10 at a position behind the carrier 16 with respect to the GRIN lens 32, thereby blocking the flow of the resin 40 from the upper surface of the carrier 16. The resin forming the resin flow blocking portions 44 and 45 has a high viscosity, e.g., 80,000 mPa. s.

In the modification shown in FIG. 9B, a closed resin flow blocking portion 47 is formed on the L-shaped block 10 and the carrier 16 so as to surround an area under the spherical front end 32a of the GRIN lens 32, the LD 18, the monitor PD 20 and an area behind the carrier 16 with respect to the GRIN lens 32. The resin flow blocking portions 47 is similarly formed of a high-viscous resin.

Figure 10:
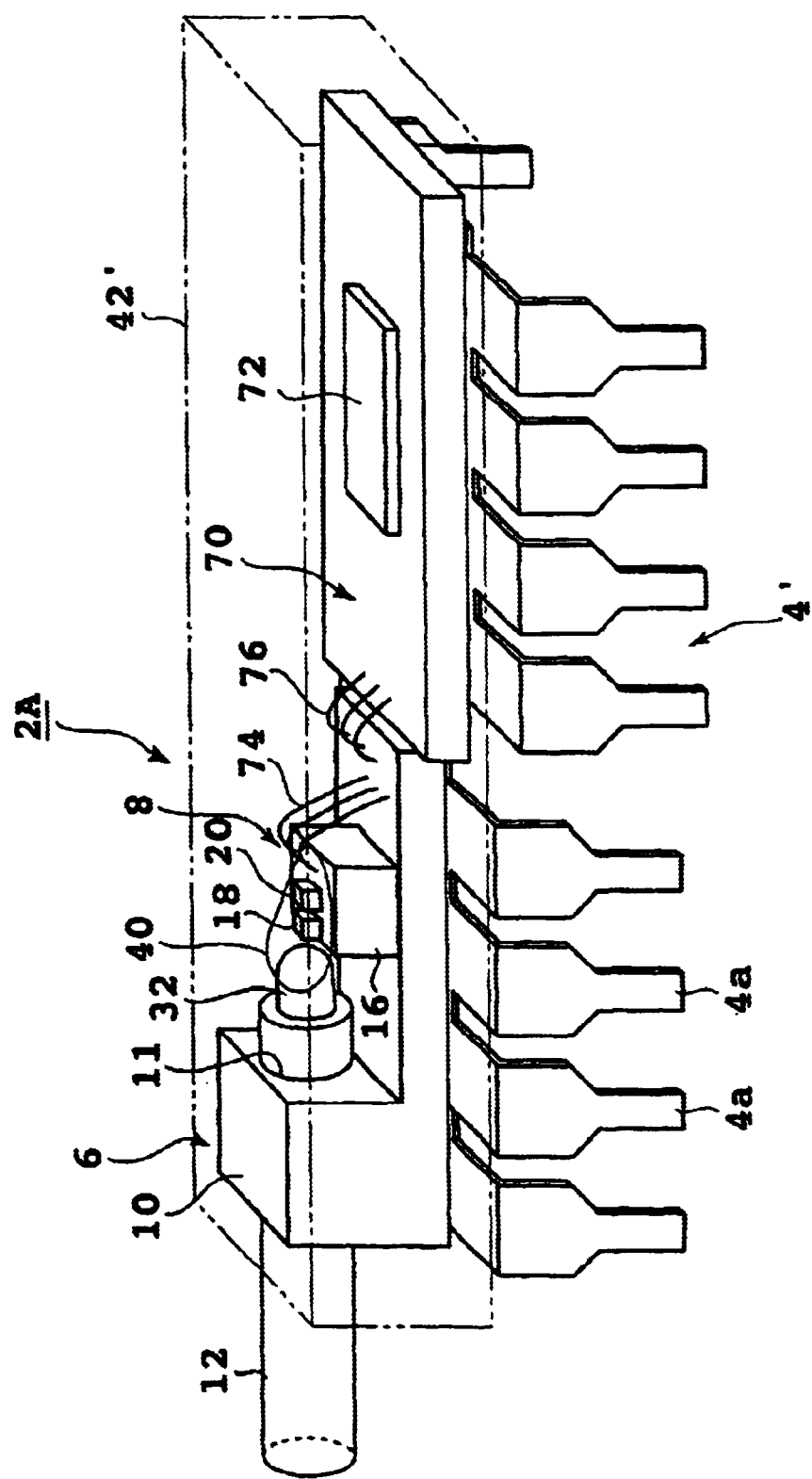
FIG. 10 is a perspective view of a receptacle type optical module according to a second preferred embodiment of the present invention.

FIG. 10 is a perspective view of a receptacle type optical module 2A according to a second preferred embodiment of the present invention. In this preferred embodiment, not only a ferrule assembly 6 combined with a carrier assembly 8, but also an electrical circuit unit 70 including a driver IC 72 is mounted on a lead frame 4'. The carrier assembly 8 and the ferrule assembly 6 are connected through gold wires 74 by wire bonding, and the ferrule assembly 6 and the electrical circuit unit 70 are connected through gold wires 76 by wire bonding. The whole of the optical module 2A except a part of the ferrule 12 and a part of the lead frame 4' is encapsulated in a resin molded package 42'. That is, the electrical circuit unit 70 is also covered with a molding resin. Thus, the optical module 2A is constructed as an opto-electrical conversion module, thereby effecting a further reduction in module size.

According to the present invention, the following effects can be obtained.

(1) By the use of the L-shaped block in which the ferrule is press-fitted, sufficient mechanical rigidity can be obtained to ensure a strength against pressures received in connecting and disconnecting an optical connector and in molding.

(2) A general LD used in the art rather than a special LD is used in the present invention, so that the optical module of the present invention has versatility and can therefore be produced at a low cost.

(3) Since the LD is mounted on the carrier to prepare the carrier assembly, the reliability of the LD can be evaluated in the form of the carrier assembly. Accordingly, a cost increase due to module assembly yield can be suppressed.

(4) The ferrule assembly can be mounted on a lead frame or a metal package, thereby allowing desired product designs according to applications.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A receptacle type optical module comprising:
   a lead frame having a plurality of leads;
   a block mounted on said lead frame, said block having a through hole;
   a ferrule inserted and fixed in said through hole of said block, said ferrule having an optical fiber;
   a carrier mounted on said block, said carrier having a wiring pattern;
   an optical element mounted on said carrier;
   a graded index lens fixed to an end face of said ferrule, said graded index lens having a spherical end face adjacent to said optical element; and
   a transparent resin for sealing an optical coupling portion between said optical element and said graded index lens.

2. A receptacle type optical module according to claim 1, wherein said block has an L-shape.

3. A receptacle type optical module according to claim 1, further comprising resin flow blocking means provided on said block.

4. A receptacle type optical module according to claim 3, wherein said rein flow blocking means is formed of a resin having a viscosity higher than that of said transparent resin.

5. A receptacle type optical module comprising:
   a lead frame having a plurality of leads;
   an L-shaped block mounted on said lead frame, said L-shaped block having a through hole;
   a ferrule inserted and fixed in said through hole of said L-shaped block, said ferrule having an optical fiber;
   a carrier mounted on said L-shaped block, said carrier having a wiring pattern;
   an optical element mounted on said carrier;
   a graded index lens fixed to an end face of said ferrule, said graded index lens having a spherical end face adjacent to said optical element;
   a transparent resin for sealing an optical coupling portion between said optical element and said graded index lens; and
   a resin molded package for encapsulating all of said lead frame, said L-shaped block, said ferrule, said carrier, and said optical element except a part of said lead frame and a part of said ferrule.

6. A production method for a receptacle type optical module, comprising the steps of:
   mounting an optical element on a carrier having a wiring pattern;
   connecting said wiring pattern of said carrier and said optical element by means of a first wire;
   performing a screening test for said optical element;
   preparing an L-shaped block having a through hole;
   press-fitting a ferrule having an optical fiber into said through hole of said L-shaped block;
   mounting said carrier on said L-shaped block in the condition where said optical element is mounted on said carrier;
   bonding a graded index lens to an end face of said ferrule after aligning said graded index lens to said optical fiber and said optical element;

mounting said L-shaped block on a lead frame;

connecting said wiring pattern of said carrier and said lead frame by means of a second wire;

sealing an optical coupling portion between said optical element and said graded index lens with a transparent resin; and encapsulating all of said lead frame, said L-shaped block, said ferrule, said carrier, and said optical element except a part of said lead frame and a part of said ferrule in a resin molded package.

7. A production method according to claim 6, further comprising the step of cutting said lead frame after said encapsulating step to form a plurality of leads.

8. A production method according to claim 6, further comprising the step of applying a resin having a viscosity higher than that of said transparent resin onto said L-shaped block before said sealing step to form a dam for blocking the flow of said transparent resin.

\* \* \* \* \*

UNITED STATES PATENT AND TRADEMARK OFFICE
CERTIFICATE OF CORRECTION

PATENT NO. : 6,715,934 B2  
DATED : April 6, 2004  
INVENTOR(S) : Fumitake Suzuki et al.

Page 1 of 1

It is certified that error appears in the above-identified patent and that said Letters Patent is hereby corrected as shown below:

Column 8,
Line 29, delete "rein" and insert -- resin --.

Signed and Sealed this

Sixteenth Day of November, 2004

JON W. DUDAS  
*Director of the United States Patent and Trademark Office*